US008553708B2

(12) United States Patent
Zhang et al.

(10) Patent No.: US 8,553,708 B2
(45) Date of Patent: Oct. 8, 2013

(54) BANDWITH ALLOCATION METHOD AND ROUTING DEVICE

(75) Inventors: Yongping Zhang, Beijing (CN); Pingan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 13/185,850

(22) Filed: Jul. 19, 2011

(65) Prior Publication Data

US 2011/0274117 A1 Nov. 10, 2011

Related U.S. Application Data

(63) Continuation of application No. PCT/CN2009/073400, filed on Aug. 21, 2009.

(30) Foreign Application Priority Data

Jan. 20, 2009 (CN) .......................... 2009 1 0076773

(51) Int. Cl.
*H04L 12/56* (2011.01)
(52) U.S. Cl.
USPC ..................... 370/401; 370/235; 370/395.41
(58) Field of Classification Search
USPC ...... 370/230, 230.1, 231–235, 237, 400–401, 370/465, 468, 352–356
See application file for complete search history.

(56) References Cited

U.S. PATENT DOCUMENTS

| 6,377,583 | B1* | 4/2002 | Lyles et al. .................... 370/412 |
| 6,785,737 | B2* | 8/2004 | Lee et al. ...................... 709/241 |
| 6,868,062 | B1 | 3/2005 | Yadav et al. |
| 7,023,829 | B1* | 4/2006 | Holmquist et al. ............ 370/341 |
| 7,535,842 | B1* | 5/2009 | Venables et al. ........... 370/230.1 |
| 7,808,918 | B2* | 10/2010 | Bugenhagen .................. 370/242 |
| 7,990,853 | B2* | 8/2011 | Brolin ........................... 370/229 |
| 8,125,902 | B2* | 2/2012 | Rochon et al. ............. 370/230.1 |
| 8,194,555 | B2* | 6/2012 | Morrill et al. ................. 370/252 |
| 2002/0044553 | A1 | 4/2002 | Chakravorty |

(Continued)

FOREIGN PATENT DOCUMENTS

| CN | 1859599 A | 11/2006 |
| CN | 101146240 A | 3/2008 |
| CN | 101478527 A | 7/2009 |
| EP | 2 197 218 A1 | 6/2010 |
| WO | WO 2007/060194 A1 | 5/2007 |
| WO | WO 2007/127113 A2 | 11/2007 |

OTHER PUBLICATIONS

1st Office Action in corresponding Japanese Patent Application No. 2011-546568 (Sep. 4, 2012).

(Continued)

*Primary Examiner* — Kevin Mew
(74) *Attorney, Agent, or Firm* — Leydig, Voit & Mayer, Ltd.

(57) ABSTRACT

A bandwidth allocation method and a routing device are provided. The bandwidth allocation method includes: obtaining traffic of a member port belonging to a binding link (101); and allocating corresponding bandwidth to the member port according to total bandwidth of a centralized scheduler and the traffic of the member port (102). By allocating the bandwidth to the member port belonging to the binding link through the centralized scheduler, the bandwidth may be flexibly allocated to the member port according to the traffic of the member port, so that not only the accuracy of allocating the bandwidth to the member port is ensured, but also bandwidth resources on the binding link are saved.

11 Claims, 2 Drawing Sheets

(56) References Cited

U.S. PATENT DOCUMENTS

| | | |
|---|---|---|
| 2003/0118025 A1 | 6/2003 | Lee |
| 2004/0228278 A1 | 11/2004 | Bruckman et al. |
| 2005/0276263 A1* | 12/2005 | Suetsugu et al. ............. 370/389 |
| 2008/0049615 A1* | 2/2008 | Bugenhagen ............. 370/230.1 |
| 2013/0033984 A1* | 2/2013 | Mcnaughton et al. ..... 370/230.1 |

OTHER PUBLICATIONS

Office Action mailed Feb. 28, 2012, for related Chinese Patent Application No. 200910076773.7.

Supplementary European Search Report and Annex to the European Search Report issued in European Application No. EP 09 83 8648, mailed May 23, 2012 (8 pages).

International Search Report from the Chinese Patent Office in International Application No. PCT/CN2009/073400 mailed Dec. 3, 2009.

Written Opinion of the International Searching Authority in International Application No. PCT/CN2009/073400 mailed Dec. 3, 2009.

First Chinese Office Action of Chinese Application No. 200910076773.7 mailed Jun. 24, 2011.

1st Office Action in corresponding European Patent Application No. 09838648.5 (Mar. 5, 2013).

1st Office Action in corresponding European Patent Application No. 09 838 648.5 (Mar. 5, 2013).

* cited by examiner

BANDWITH ALLOCATION METHOD AND ROUTING DEVICE

CROSS REFERENCE

This application is a continuation of International Application No. PCT/CN2009/073400, filed on Aug. 21, 2009, which claims priority to Chinese Patent Application No. 200910076773.7, filed on Jan. 20, 2009, both of which are hereby incorporated by reference in their entireties.

FIELD OF THE DISCLOSURE

The present disclosure relates to the field of communications technologies, and in particular, to a bandwidth allocation method and a routing device.

BACKGROUND OF THE DISCLOSURE

A binding link refers to that a plurality of relevant physical ports are bound to a link to be used as a logical port. The link bound to the plurality of physical ports is called the binding link, and the physical ports bound to the binding link are called member ports of the binding link. With the rapid development of the network, the binding link is increasingly widely used. However, it is still in need of a good method for implementing bandwidth limit on the binding link. In a distributed system, the existing bandwidth limit on the binding link is generally performed in two methods. A first method is that the bandwidth limit is performed on each practical physical port on the binding link. According to this method, by adjusting bandwidth of each member port, an accurate value of the bandwidth limit on the binding link is finally achieved, but the adjustment needs to be operated among a plurality of physical ports, so the adjustment procedure is complicated. A second method is that total bandwidth limit is performed on the binding link, and then the limited total bandwidth is distributed to member boards of the binding link. According to the second method, the total bandwidth needs to be allocated, and the allocation method is: averagely allocating the bandwidth according to a number of the member boards; or limiting the bandwidth of each member board on the binding link to be the total bandwidth.

According to the existing method, after the total bandwidth limit is performed on the binding link, the limited total bandwidth is distributed to the member boards of the binding link. The bandwidth allocation method is fixed and cannot he adjusted, and the limited bandwidth allocated to the binding link is not accurate, so that bandwidth resources on the binding link are wasted.

SUMMARY OF THE DISCLOSURE

Embodiments of the present disclosure provide a bandwidth allocation method and a routing device, which are used to solve the problem in the prior art that bandwidth resources on a binding link are wasted because of the fixed bandwidth allocation method, and save the bandwidth resources on the binding link.

An embodiment of the present disclosure provides a bandwidth allocation method, where the bandwidth allocation method includes:

obtaining traffic of a member port belonging to a binding link; and allocating corresponding bandwidth to the member port according to total bandwidth of a centralized scheduler and the traffic of the member port.

An embodiment of the present disclosure also provides a routing device, where the routing device includes:

a scheduler, configured to obtain traffic of a member port belonging to a binding link, and allocate corresponding bandwidth to the member port according to total bandwidth of the scheduler and the traffic of the member port; and the member port, configured to perform transmission according to the bandwidth allocated by the scheduler.

The embodiments of the present disclosure provide the bandwidth allocation method and the routing device, and the bandwidth may be flexibly allocated to the member port by using the centralized scheduler, so that the bandwidth resources on the binding link are saved.

BRIEF DESCRIPTION OF THE DRAWINGS

To illustrate the technical solutions according to the embodiments of the present disclosure more clearly, the accompanying drawings for describing the embodiments are introduced briefly in the following. The accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions of the present disclosure are further described in detail through the accompanying drawings and embodiments in the following.

Figure 1:
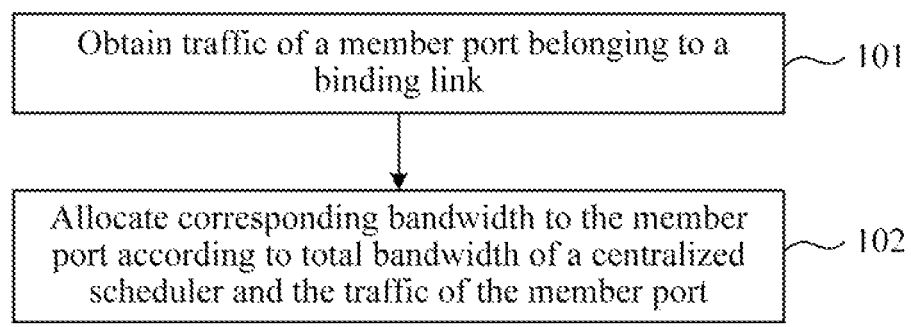
FIG. 1 is a flow chart of an embodiment of a bandwidth allocation method according to the present disclosure.

FIG. 1 is a flow chart of an embodiment of a bandwidth allocation method according to the present disclosure. As shown in FIG. 1, the bandwidth allocation method includes the following steps.

Step 101: Obtain traffic of a member port belonging to a binding link.

Figure 2:
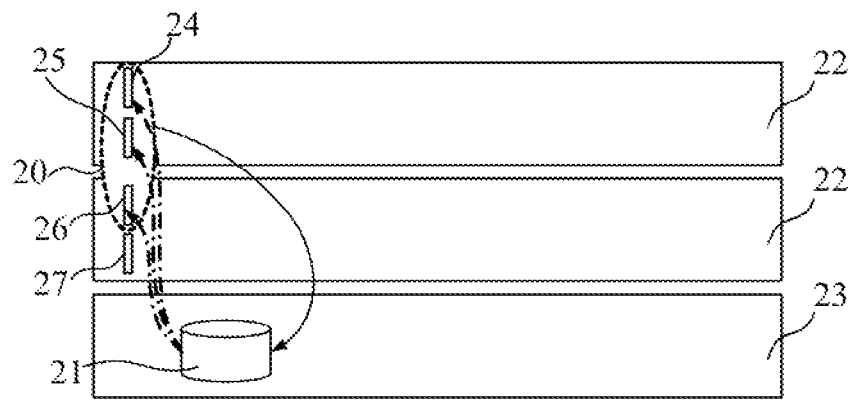
FIG. 2 is a schematic diagram of a centralized scheduler in the embodiment of the bandwidth allocation method according to the present disclosure.
Figure 3:
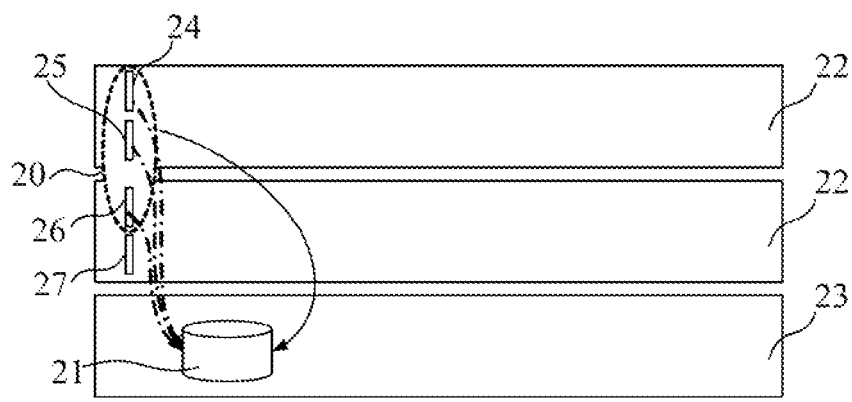
FIG. 3 is a schematic diagram of another centralized scheduler in the embodiment of the bandwidth allocation method according to the present disclosure.

Many service processing boards configured to process specific services are provided in a communication network, and each service processing board has a plurality of physical ports. FIG. 2 is a schematic diagram of a centralized scheduler in the embodiment of the bandwidth allocation method according to the present disclosure, and FIG. 3 is a schematic diagram of another centralized scheduler in the embodiment of the bandwidth allocation method according to the present disclosure. As shown in FIG. 2 and FIG. 3, in a binding link technology, to perform centralized control and management on traffic of a plurality of physical ports on a link, some function-related or service-related physical ports on a plurality of service processing boards are bound to be used as a logical port 20 of a binding link. All the physical ports bound to the logical port 20 are member ports of the binding link, and the logical port 20 includes member ports 24, 25, and 26, while a physical port 27 not bound to the logical port 20 is not a member port of the binding link. All the member ports in the logical port 20 may not be on one service processing board 22, and all the physical ports on one service processing board 22 may not belong to one logic port 20 at the same time. Centralized control can be performed on the traffic passing through the binding link by implementing bandwidth limit on the logical port 20. A centralized scheduler 21 may be established according to a bandwidth limit value of the binding link, and total bandwidth of the centralized scheduler 21 is set to be the bandwidth limit value of the binding link. The bandwidth limit value of the binding link is a maximum bandwidth value of the binding link, for example, a maximum bit number allowed to pass through the binding link in one second. The centralized scheduler 21 generates a first number of tokens corresponding to the total bandwidth, for example, the total bandwidth of the centralized scheduler is 100 Mega bit per second (Mbps), 100 tokens may be generated, and each token represents transmission authority having the bandwidth of 1 Mbps. The centralized scheduler 21 may be established on the service processing board 22, or may be established on a dedicated centralized processing board 23, that is, a tunnel board or a Tunnel Support Unit (TSU). The service processing board 22 refers to a board set with a plurality of physical ports configured to transmit specific services, and the centralized scheduler may be established on the board; and the centralized processing board 23 refers to a board on which the centralized scheduler may be established and no physical port is provided.

When the centralized scheduler actively schedules the member ports belonging to the binding link, the centralized scheduler polls the member ports and obtains traffic of the member ports. Specifically, first identification information belonging to the member ports of the binding link is pre-stored on the centralized scheduler, and when the centralized scheduler is required to schedule the member ports, the traffic of the corresponding member ports may be obtained according to the first identification information. For example, in FIG. 2, first identification information a1 of the member port 24, first identification information a2 of the member port 25, and first identification information a3 of the member port 26 are pre-stored in the centralized scheduler 21. The centralized scheduler 21 may respectively obtain the traffic of the member ports 24, 25, and 26 according to the first identification information a1, a2, and a3.

When requesting the centralized scheduler for scheduling, the member ports inform the centralized scheduler of the traffic of the member ports. Specifically, second identification information of the centralized scheduler is pre-stored on the member ports, in which the second identification information is used to identify information such as a position and a serial number of the centralized scheduler. For example, in FIG. 3, the second identification information of the centralized scheduler 21 is pre-stored on the member ports 24, 25, and 26, and it is assumed that the serial number of the centralized scheduler 21 is "0001", and the position thereof is on an X0 board. The member ports 24, 25, and 26 may send a scheduling request message to the centralized scheduler 21 having the serial number of "0001" and the position on the X0 board according to the second identification information to request the centralized scheduler 21 to schedule the member ports, and notify the centralized scheduler 21 of the traffic of the member ports through the scheduling request message at the same time.

Figure 4:
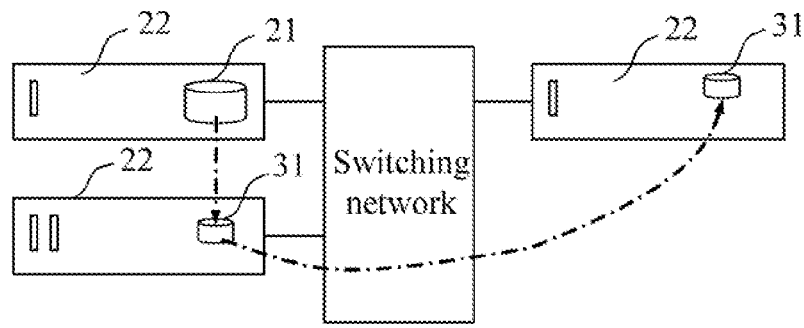
FIG. 4 is a schematic diagram of a member scheduler in the embodiment of the bandwidth allocation method according to the present disclosure.

In addition to the establishment of the centralized scheduler, a member scheduler may further be established on each service processing board where the member ports are located. FIG. 4 is a schematic diagram of a member scheduler in the embodiment of the bandwidth allocation method according to the present disclosure. As shown in FIG. 4, a centralized scheduler 21 may be set on a service processing board 22 or a centralized processing board. A member scheduler 31 is connected to the centralized scheduler 21 to form a scheduler link with the centralized scheduler 21 as a head node. All nodes after the head node on the scheduler link are member schedulers, and first identification information of all member ports on the service processing board 22 corresponding to the member scheduler 31 may be stored in the member scheduler 31. The member scheduler may obtain traffic of all the member ports on the service processing board corresponding to the member scheduler according to the stored first identification information therein. The method for obtaining the traffic of the member ports by the member scheduler may be categorized into two situations that: the member scheduler actively obtains the traffic, or the member ports actively inform the traffic.

Step 102: Allocate corresponding bandwidth to the member port according to the total bandwidth of the centralized scheduler and the traffic of the member port.

The centralized scheduler may be connected to the logical port of the binding link, for example, connected through a network cable. After the centralized scheduler generates the first number of tokens according to the total bandwidth, the method for scheduling all the member ports bound to the binding link may be categorized into the following several situations.

In a first situation, when scheduling a member port, the centralized scheduler allocates corresponding bandwidth to the member port according to traffic of the member port.

When the centralized scheduler stores the first identification information of all the member ports belonging to the binding link, and if the traffic of a member port polled by the centralized scheduler according to the first identification information does not exceed the total bandwidth of the centralized scheduler, the centralized scheduler allocates a second number of tokens corresponding to the traffic of the polled member port to the polled member port; and if the traffic of the member port polled by the centralized scheduler according to the first identification information exceeds the total bandwidth of the centralized scheduler, the centralized scheduler allocates the first number of tokens to the polled member port, and traffic of non-polled member ports is stored in their respective buffers to wait for polling. The centralized scheduler may store a plurality of first identification information, in which each first identification information corresponds to one member port, and the centralized scheduler polls all the member ports belonging to the binding link in sequence according to the first identification information. The sequence of polling the member ports by the centralized scheduler may be preset, for example, priorities of the member ports are set, and the polling is performed according to a descending sequence of the priorities, or the polling is performed according to serial numbers of the member ports or the first identification information. As shown in FIG. 2, the centralized scheduler 21 initiates the polling for the member ports 24, 25, and 26. It is assumed that the centralized scheduler 21 polls the member port 25, and the non-polled member ports 24 and 26 may also have traffic to be transmitted; to prevent loss of the traffic of the non-polled member ports, the traffic of the non-polled member ports may be stored in their respective buffers to wait for polling, and after polling the member port 25, the centralized scheduler 21 continues to poll the member port 26 according to the set sequence. If the traffic of the member port 25 polled by the centralized scheduler 21 does not exceed the total bandwidth of the centralized scheduler 21, the centralized scheduler 21 allocates the second number of tokens corresponding to the traffic of the polled member port 25 to the polled member port; and if the traffic of the member port 25 polled by the centralized scheduler 21 exceeds the total bandwidth of the centralized scheduler 21, the centralized scheduler 21 allocates the first number of tokens of the centralized scheduler to the polled member port 25. The member port polled by the centralized scheduler each time empties the traffic in the buffer thereof, and when the traffic of the polled member port does not exceed the total bandwidth of the centralized scheduler, sufficient bandwidth may be allocated to the polled member port, and the polled member port may forward all the traffic; while when the traffic of the polled member port exceeds the total bandwidth of the centralized scheduler, insufficient bandwidth is allocated to the polled member port, and a part of the traffic exceeding the total bandwidth is discarded. For example, in FIG. 2, it is assumed that the total bandwidth of the centralized scheduler 21 is 30 Mbps, the centralized scheduler 21 generates the first number of tokens, in which the first number is "30", and each token represents bandwidth of 1 Mbps. It is assumed that the traffic of the member port 25 polled by the centralized scheduler 21 is 20 Mbps; and the centralized scheduler 21 allocates the second number of tokens to the member port 25, in which the second number is "20"; as "1" token represents bandwidth of 1 Mbps, "20" tokens represent that the bandwidth allocated to the member port 25 this time is 20 Mbps. It is assumed that the traffic of the member port 25 polled by the centralized scheduler 21 is 40 Mbps, but the centralized scheduler 21 only has "30" tokens at most, so only "30" tokens can be allocated to the member port 25 at most at this moment. "30" tokens represent that the bandwidth allocated to the member port 25 this time is 30 Mbps, and only the traffic of 30 Mbps can pass through the member port 25 at this moment, and the traffic exceeding 30 Mbps is discarded. When the member port 25 is polled, the member ports 24 and 26 are non-polled member ports. If traffic exists in the non-polled member ports 24 and 26, the traffic is stored in their respective buffers.

In a second situation, when a member port requests a centralized scheduler for scheduling, the centralized scheduler allocates corresponding bandwidth to the member port according to traffic of the member port.

The member port stores second identification information of the centralized scheduler and sends a scheduling request message to the centralized scheduler corresponding to the second identification information, and if the traffic of the member port requesting scheduling does not exceed second bandwidth currently allowed by the centralized scheduler, the centralized scheduler allocates second number of tokens corresponding to the traffic of the member port requesting scheduling to the member port requesting scheduling; and if the traffic of the member port requesting scheduling exceeds the second bandwidth currently allowed by the centralized scheduler, the centralized scheduler allocates a third number of tokens corresponding to the second bandwidth to the member port requesting scheduling. The second identification information formed of the position and the serial number of the centralized scheduler is pre-stored in the member port. As shown in FIG. 3, it is assumed that the member port 25 has traffic (for example, collection of some packets) to be transmitted, the member port 25 sends the scheduling request message to the centralized scheduler 21 corresponding to the second identification information, for example, the member port sends a physical signal of "20" bits to the centralized scheduler and informs the centralized scheduler that the member port has traffic of 20 Mbps to be transmitted at this moment, and definitely, a traffic amount specifically represented by the physical signal may be preset. As the centralized scheduler 21 may already allocate the bandwidth to some member ports, for example, the member port 24, the currently remaining bandwidth is the second bandwidth. If the traffic of the member port 25 requesting scheduling does not exceed the second bandwidth currently allowed by the centralized scheduler 21, the centralized scheduler 21 allocates the second number of tokens corresponding to the traffic of the member port requesting scheduling to the member port 25 requesting scheduling, that is, the member port requesting scheduling obtains packet forwarding authority, and may forward all packets requested this time. If the traffic of the member port 25 requesting scheduling exceeds the second bandwidth currently allowed by the centralized scheduler 21, the centralized scheduler 21 can only allocate the remaining third number of tokens corresponding to the second bandwidth to the member port 25 requesting scheduling, that is, the member port 25 requesting scheduling fails to obtain the forwarding authority, and is required to discard a part of the packets requested to be forwarded before forwarding the packets, or discard all the packets requested to be forwarded. For example, it is assumed that the total bandwidth of the centralized scheduler 21 is 30 Mbps, the first number of generated tokens is "30", and after "18" tokens are allocated to the member port 24, "12" tokens are left; at this moment, "12" is the third number, and the currently remaining second bandwidth of the centralized scheduler is 12 Mbps. It is assumed that the traffic of the member port 25 requesting scheduling is 10 Mbps which is smaller than the second bandwidth of 12 Mbps, the centralized scheduler 21 allocates "10" tokens corresponding to the traffic of 10 Mbps of the member port 25 to the member port 25, and at this moment, "10" is the second number. It is assumed that the traffic of the member port 25 requesting scheduling is 15 Mbps which is greater than the second bandwidth of 12 Mbps, the centralized scheduler 21 allocates "12" tokens corresponding to 12 Mbps to the member port 25, and at this moment, "12" is the third number; and at this moment, the member port 25 may discard packets of 3 Mbps and then send the remaining traffic, or discard all the packets.

In a third situation, when a centralized scheduler and a member scheduler establish a scheduler link, the centralized scheduler allocates corresponding bandwidth to the member scheduler.

One member scheduler may be established in advance on each service processing board where member ports are located, and first identification information of all the member ports on the service processing board where the member scheduler is located is stored in the member scheduler. The member scheduler is connected to the centralized scheduler to form the scheduler link with the centralized scheduler as a head node, and all nodes after the head node on the scheduler link are member schedulers.

The centralized scheduler may deliver first number of tokens to a member scheduler along the scheduler link. It is assumed that the first number is "30", the member scheduler obtains a required fourth number of tokens according to a sum of the traffic of the member ports on the service processing board where the member scheduler is located, in which the fourth number is determined according to the sum of the traffic of all the member ports on the service processing board where the member scheduler is located. For example, if the sum of the traffic of the member ports on the service processing board where the member scheduler is located is 20 Mbps, the member scheduler is required to obtain the fourth number of tokens, in which the fourth number is "20". Afterwards, the member scheduler sends the remaining tokens ("10" tokens) to a next member scheduler on the scheduler link in sequence. Until the member scheduler uses up all the tokens or the remaining tokens are discarded after the last member scheduler on the scheduler link obtains required tokens, the scheduling ends. During the scheduling procedure, if the number of the remaining tokens cannot satisfy the requirement of a member scheduler, after the remaining tokens are allocated to the member scheduler, the member scheduler discards a part of traffic and performs transmission according to the remaining tokens, and the traffic of the member schedulers which do not obtain sufficient tokens is discarded. A sequence of the member schedulers on the scheduler link may be preset, for example, the sequence of the member schedulers may be preset according to priorities of the member schedulers.

A member scheduler may actively request the centralized scheduler on the scheduler link to obtain tokens. When sending a request for obtaining tokens to the centralized scheduler, the member scheduler informs the centralized scheduler of the fourth number of tokens required by the member scheduler. The centralized scheduler checks the number of the currently remaining tokens thereof, and if the number of the remaining tokens is greater than or equal to the fourth number, the centralized scheduler allocates the fourth number of tokens to the member scheduler; otherwise, allocates the remaining tokens to the member scheduler.

According to this embodiment, by allocating the bandwidth to the member port belonging to the binding link through the centralized scheduler, the bandwidth may be flexibly allocated to the member port according to the traffic of the member port, so that not only the accuracy of allocating the bandwidth to the member port is ensured, but also bandwidth resources on the binding link are saved.

Persons of ordinary skill in the art should understand that, all or a part of the steps of the method embodiment may be implemented by a program instructing relevant hardware. The program may be stored in a computer readable storage medium. When the program is executed, the steps of the method embodiment are performed. The storage medium may be any medium capable of storing program codes, such as a ROM, a RAM, a magnetic disk, or an optical disk.

Figure 5:
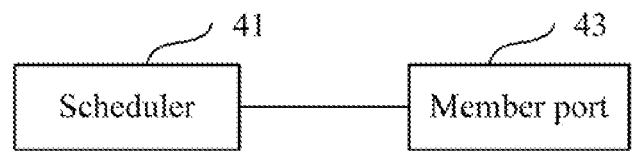
FIG. 5 is a schematic structural diagram of a first embodiment of a routing device according to the present disclosure.

FIG. 5 is a schematic structural diagram of a first embodiment of a routing device according to the present disclosure. As shown in FIG. 5, the routing device includes a scheduler 41 and a member port 43. The scheduler 41 is configured to obtain traffic of the member port 43 belonging to a binding link, and allocate corresponding bandwidth to the member port according to total bandwidth of the scheduler 41 and the traffic of the member port 43. The member port 43 is configured to perform transmission according to the bandwidth allocated by the scheduler.

Specifically, in the binding link technology, to perform centralized control and management on traffic of a plurality of physical ports on a link, some function-related or service-related physical ports on a plurality of service processing boards are usually bound to be used as a logical port of the binding link, in which all the physical ports bound to the logical port of the binding link are member ports on the binding link. The scheduler 41 may be established according to a bandwidth limit value of the logical port of the binding link, that is, the bandwidth limit value of the binding link that the member ports belong to. At this moment, the scheduler 41 is a centralized scheduler, and the centralized scheduler may allocate corresponding bandwidth to each member port belonging to the binding link according to the total bandwidth and the traffic of the member port. Furthermore, a corresponding scheduler 41 may be established on each service processing board where the member port 43 is located, and at this moment, the scheduler is a member scheduler. The member scheduler and the centralized scheduler establish a scheduler link, and the centralized scheduler allocates corresponding bandwidth to the member scheduler through the scheduler link. In this embodiment, the method for scheduling and bandwidth allocation among the centralized scheduler, the member port, and the member scheduler may refer to relevant descriptions of the embodiment of the bandwidth allocation method according to the present disclosure.

According to this embodiment, by allocating the bandwidth to the member port belonging to the binding link by using the scheduler, the bandwidth may be flexibly allocated to the member port according to the traffic of the member port, so that not only the accuracy of allocating the bandwidth to the member port is ensured, but also bandwidth resources on the binding link are saved.

Figure 6:
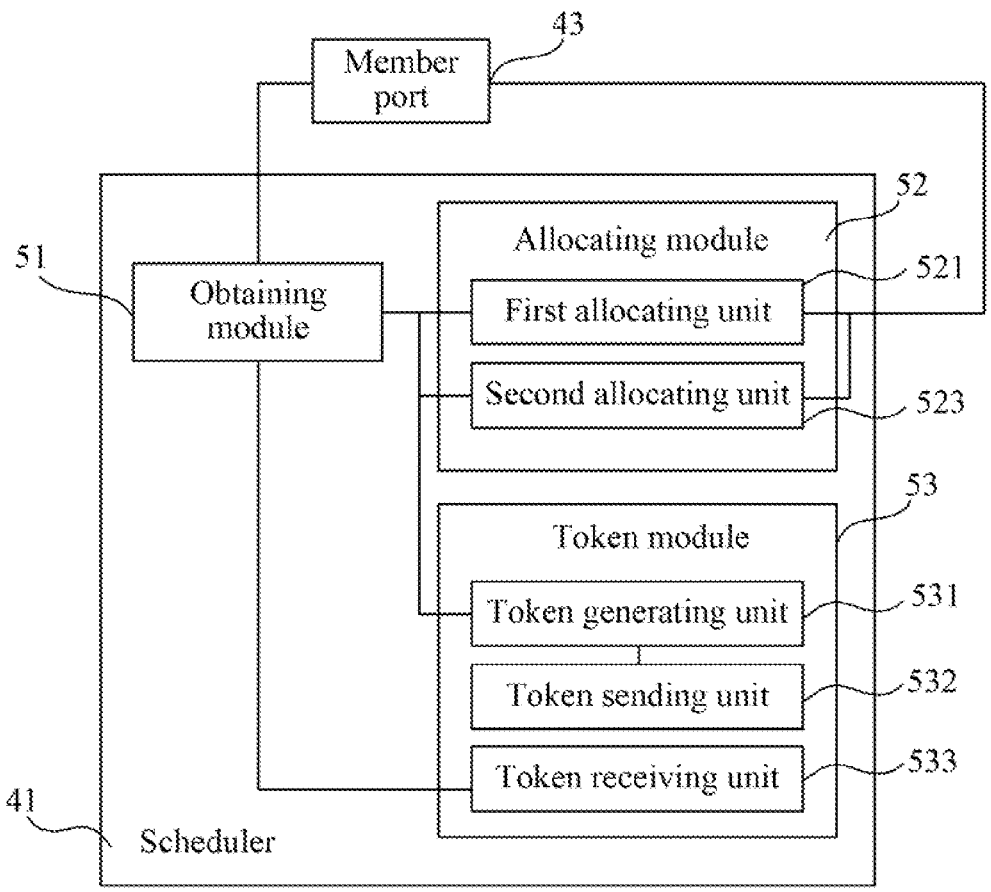
FIG. 6 is a schematic structural diagram of a second embodiment of the routing device according to the present disclosure.

FIG. 6 is a schematic structural diagram of a second embodiment of the routing device according to the present disclosure. As shown in FIG. 6, on the basis of the first embodiment of the routing device according to the present disclosure, a scheduler 41 includes an obtaining module 51 and an allocating module 52. The obtaining module 51 is configured to obtain traffic of a member port 43 belonging to a binding link. The allocating module 52 is configured to allocate corresponding bandwidth to the member port 43 according to total bandwidth of the scheduler 41 and the traffic of the member port 43. Further, the scheduler 41 includes a token module 53, configured to generate a first number of tokens corresponding to the total bandwidth. The allocating module 52 includes a first allocating unit 521 and/or a second allocating unit 523. The first allocating unit 521 is configured to allocate a second number of tokens corresponding to traffic of a polled member port to the polled member port when the scheduler stores first identification information of the member port and the traffic of the member port polled by the scheduler according to the first identification information does not exceed the total bandwidth; otherwise, allocate the first number of tokens to the polled member port, in which traffic of non-polled member ports is stored in their respective buffers to wait for polling. The second allocating unit 523 is configured to allocate the second number of tokens corresponding to traffic of a member port requesting scheduling to the member port requesting scheduling when the member port stores second identification information of the scheduler and sends a scheduling request message to the scheduler corresponding to the second identification information and if the traffic of the member port requesting scheduling does not exceed second bandwidth currently allowed by the scheduler; otherwise, allocate a third number of tokens corresponding to the second bandwidth to the member port requesting scheduling of a token generating unit 531, a token sending unit 532, and a token receiving unit 533. The token generating unit 531 is configured to generate the first number of tokens corresponding to the total bandwidth. The token sending unit 532 is configured to deliver the tokens along the scheduler link. The token receiving unit 533 is configured to receive and obtain a required fourth number of tokens, in which the fourth number is determined according to a sum of traffic of all member ports on the service processing board where the scheduler is located.

In this embodiment, the scheduler 41 may be used as the centralized scheduler. Specifically, the centralized scheduler may be established according to the bandwidth limit value of the binding link that the member port 43 belongs to, in which the total bandwidth of the centralized scheduler is the bandwidth limit value of the binding link. The token generating unit 531 generates the first number of tokens corresponding to the total bandwidth. When the centralized scheduler stores the first identification information of the member port, the centralized scheduler polls the member port according to the first identification information, and the traffic of the non-polled member ports is stored in the buffers of the non-polled member ports to wait for polling. If the traffic of the member port polled by the centralized scheduler does not exceed the total bandwidth, the first allocating unit 521 allocates the second number of tokens corresponding to the traffic of the polled member port to the polled member port; otherwise, the first allocating unit 521 allocates the first number of tokens to the polled member port. When storing the second identification information of the scheduler, the member port sends the scheduling request message to the scheduler corresponding to the second identification information, and if the traffic of the member port requesting scheduling does not exceed the second bandwidth currently allowed by the scheduler, the second allocating unit 523 allocates the second number of tokens corresponding to the traffic of the member port requesting scheduling to the member port requesting scheduling; otherwise, the second allocating unit 523 allocates the third number of tokens corresponding to the second bandwidth to the member port requesting scheduling. In this embodiment, the method for allocating the bandwidth to the member port by the first allocating unit and the second allocating unit of the scheduler may refer to the description of the method for allocating the bandwidth to the member port by the centralized scheduler in the embodiment of the bandwidth allocation method according to the present disclosure. Furthermore, in this embodiment, when the scheduler is the centralized scheduler, after the scheduler link with the centralized scheduler as the head node is established on the binding link, the token generating unit 531 generates the corresponding first number of tokens according to the total bandwidth, and then the token sending unit 532 delivers the first number of tokens to a next scheduler along the scheduler link. In this embodiment, the method for generating and sending the tokens by the token generating unit may refer to the description of the method for generating and sending the tokens by the centralized scheduler in the embodiment of the bandwidth allocation method according to the present disclosure.

In this embodiment, the scheduler 41 may also be used as a member scheduler. Specifically, a corresponding member scheduler is established on each service processing board where the member port 43 is located, the member scheduler is connected to the centralized scheduler to form the scheduler link, and each member scheduler stores the first identification information of all the member ports on the service processing board where the member scheduler is located. In this embodiment, when the scheduler is the member scheduler, the token receiving unit 533 receives tokens sent by a previous scheduler on the scheduler link, obtains the required fourth number of tokens from the received tokens, and sends the remaining tokens to a next member scheduler on the scheduler link, in which the fourth number is determined according to the sum of the traffic of all the member ports of the member scheduler. When the member scheduler on the scheduler link uses up all the tokens sent by the centralized scheduler, the scheduling ends; or, when the last member scheduler on the scheduler link obtains the required fourth number of tokens, the remaining tokens are discarded, and the scheduling ends. In this embodiment, the method for receiving and obtaining the transferred tokens on the scheduler link by the token receiving unit may refer to the description of the method for receiving and obtaining the transferred tokens on the scheduler link by the member scheduler in the embodiment of the bandwidth allocation method according to the present disclosure.

According to this embodiment, the allocating module allocates the corresponding bandwidth to each member port according to the total bandwidth of the centralized scheduler and the traffic of the member port, and the configuration method is flexible, so that the accuracy of allocating the bandwidth to the member port is ensured, and bandwidth resources on the binding link are saved.

Furthermore, the embodiments of the present disclosure may be implemented through a computer readable storage medium, in which the computer readable storage medium includes computer program codes. When the computer program codes are run by one or more processors, the steps of the embodiments of the bandwidth allocation method may be performed.

Finally, it should be noted that the above embodiments are merely provided for describing the technical solutions of the present disclosure, but not intended to limit the present disclosure. It should be understood by persons of ordinary skill in the art that although the present disclosure has been described in detail with reference to the embodiments, modifications can be made to the technical solutions described in the embodiments, or equivalent replacements can be made to some technical features in the technical solutions, as long as such modifications or replacements do not depart from the spirit and scope of the present disclosure.

What is claimed is:

1. A bandwidth allocation method, comprising:
   obtaining traffic of a member port belonging to a binding link; and
   allocating corresponding bandwidth to the member port according to total bandwidth of a centralized scheduler and the traffic of the member port;
   establishing the centralized scheduler according to a bandwidth limit value of the binding link wherein the total bandwidth of the centralized scheduler is the bandwidth limit value of the binding link and generating by the centralized scheduler a first number of tokens corresponding to the total bandwidth;
   wherein the allocating the corresponding bandwidth to the member port according to the total bandwidth of the centralized scheduler and the traffic of the member port comprises:
   storing, by the centralized scheduler, first identification information of the member port, and if traffic of a member port polled by the centralized scheduler according to the first identification information does not exceed the total bandwidth, allocating, by the centralized scheduler, a second number of tokens corresponding to the traffic of the polled member port to the polled member port; and if the traffic of the member port polled by the centralized scheduler according to the first identification information exceeds the total bandwidth, allocating, by the centralized scheduler, the first number of tokens to the polled member port, wherein traffic of non-polled member ports is stored in their respective buffers to wait for polling; or
   storing, by the member port, second identification information of the centralized scheduler, and sending a scheduling request message to the centralized scheduler corresponding to the second identification information, and if traffic of a member port requesting scheduling does not exceed second bandwidth currently allowed by the centralized scheduler, allocating, by the centralized scheduler, the second number of tokens corresponding to the traffic of the member port requesting scheduling to the member port requesting scheduling; and if the traffic of the member port requesting scheduling exceeds the second bandwidth currently allowed by the centralized scheduler, allocating, by the centralized scheduler, a third number of tokens corresponding to the second bandwidth to the member port requesting scheduling.

2. A bandwidth allocation method, comprising:
obtaining traffic of a member port belonging to a binding link; and
allocating corresponding bandwidth to the member port according to total bandwidth of a centralized scheduler and the traffic of the member port;
establishing the centralized scheduler according to a bandwidth limit value of the binding link, wherein the total bandwidth of the centralized scheduler is the bandwidth limit value of the binding link, and generating, by the centralized scheduler, a first number of tokens corresponding to the total bandwidth;
allocating, by the centralized scheduler, a fourth number of tokens required by a member scheduler to the member scheduler, wherein the fourth number is determined according to a sum of traffic of all member ports on a service processing board where the member scheduler is located, and each service processing board comprises one member scheduler.

3. The bandwidth allocation method according to claim 2, wherein the centralized scheduler and the member scheduler are connected to form a scheduler link, and the allocating, by the centralized scheduler, the fourth number of tokens required by the member scheduler to the member scheduler comprises:
delivering, by the centralized scheduler, the first number of tokens to the member scheduler along the scheduler link, and after obtaining, by each member scheduler, the required fourth number of tokens, sending the remaining tokens to a next member scheduler on the scheduler link; or
requesting, by the member scheduler, the centralized scheduler on the scheduler link to obtain the required fourth number of tokens, wherein the fourth number is determined according to the sum of the traffic of all the member ports on the service processing board where the member scheduler is located.

4. A routing device, comprising:
a scheduler, configured to obtain traffic of a member port belonging to a binding link, and allocate corresponding bandwidth to the member port according to total bandwidth of the scheduler and the traffic of the member port; and
the member port, configured to perform transmission according to the bandwidth allocated by the scheduler;
wherein the scheduler comprises:
an obtaining module, configured to obtain the traffic of the member port belonging to the binding link; and
an allocating module, configured to allocate the corresponding bandwidth to the member port according to the total bandwidth of the scheduler and the traffic of the member port;
a token module, configured to generate a first number of tokens corresponding to the total bandwidth;
wherein the allocating module comprises:
a first allocating unit, configured to allocate a second number of tokens corresponding to traffic of a polled member port to the polled member port when the scheduler stores first identification information of the member port and the traffic of the member port polled by the scheduler according to the first identification information does not exceed the total bandwidth;
allocate the first number of tokens to the polled member port when the scheduler stores the first identification information of the member port and the traffic of the member port polled by the scheduler according to the first identification information exceeds the total bandwidth, wherein traffic of non-polled member ports is stored in their respective buffers to wait for polling; and/or
a second allocating unit, configured to allocate the second number of tokens corresponding to traffic of a member port requesting scheduling to the member port requesting scheduling when the member port stores second identification information of the scheduler and sends a scheduling request message to the scheduler corresponding to the second identification information and if the traffic of the member port requesting scheduling does not exceed second bandwidth currently allowed by the scheduler; allocate a third number of tokens corresponding to the second bandwidth to the member port requesting scheduling when the member port stores the second identification information of the scheduler and sends the scheduling request message to the scheduler corresponding to the second identification information and if the traffic of the member port requesting scheduling exceeds the second bandwidth currently allowed by the scheduler.

5. A routing device, comprising:
a scheduler configured to obtain traffic of a member port belonging to a binding link, and allocate corresponding bandwidth to the member port according to total bandwidth of the scheduler and the traffic of the member port; and
the member port configured to perform transmission according to the bandwidth allocated by the scheduler;
wherein the scheduler comprises:
an obtaining module configured to obtain the traffic of the member port belonging to the binding link; and
an allocating module, configured to allocate the corresponding bandwidth to the member port according to the total bandwidth of the scheduler and the traffic of the member port;
a token module configured to generate a first number of tokens corresponding to the total bandwidth;
wherein the token module comprises any one or more of the following units:
a token generating unit, configured to generate the first number of tokens corresponding to the total bandwidth;
a token sending unit, configured to deliver the tokens along a scheduler link; and
a token receiving unit, configured to receive and obtain a required fourth number of tokens, wherein the fourth number is determined according to a sum of traffic of all member ports on a service processing board where the scheduler is located.

6. The routing device according to claim 4, wherein the token module comprises any one or more of the following units:
a token generating unit, configured to generate the first number of tokens corresponding to the total bandwidth;
a token sending unit, configured to deliver the tokens along a scheduler link; and
a token receiving unit, configured to receive and obtain a required fourth number of tokens, wherein the fourth number is determined according to a sum of traffic of all member ports on a service processing board where the scheduler is located.

7. A non-transitory computer readable storage medium, comprising computer program codes, wherein when the computer program codes are executed by one or more processors a bandwidth allocation method is performed, wherein the bandwidth allocation method comprises:

obtaining traffic of a member port belonging to a binding link; and allocating corresponding bandwidth to the member port according to total bandwidth of a centralized scheduler and the traffic of the member port;

establishing the centralized scheduler according to a bandwidth limit value of the binding link, wherein the total bandwidth of the centralized scheduler is the bandwidth limit value of the binding link, and generating, by the centralized scheduler, a first number of tokens corresponding to the total bandwidth;

wherein the allocating the corresponding bandwidth to the member port according to the total bandwidth of the centralized scheduler and the traffic of the member port comprises:

storing, by the centralized scheduler, first identification information of the member port, and if traffic of a member port polled by the centralized scheduler according to the first identification information does not exceed the total bandwidth, allocating, by the centralized scheduler, a second number of tokens corresponding to the traffic of the polled member port to the polled member port; and if the traffic of the member port polled by the centralized scheduler according to the first identification information exceeds the total bandwidth, allocating, by the centralized scheduler, the first number of tokens to the polled member port, wherein traffic of non-polled member ports is stored in their respective buffers to wait for polling; or storing, by the member port, second identification information of the centralized scheduler, and sending a scheduling request message to the centralized scheduler corresponding to the second identification information, and if traffic of a member port requesting scheduling does not exceed second bandwidth currently allowed by the centralized scheduler, allocating, by the centralized scheduler, the second number of tokens corresponding to the traffic of the member port requesting scheduling to the member port requesting scheduling; and if the traffic of the member port requesting scheduling exceeds the second bandwidth currently allowed by the centralized scheduler, allocating, by the centralized scheduler, a third number of tokens corresponding to the second bandwidth to the member port requesting scheduling.

8. A non-transitory computer readable storage medium, comprising computer program codes, wherein when the computer program codes are executed by one or more processors, a bandwidth allocation method is performed wherein the bandwidth allocation method comprises:

obtaining traffic of a member port belonging to a binding link; and allocating corresponding bandwidth to the member port according to total bandwidth of a centralized scheduler and the traffic of the member port;

establishing the centralized scheduler according to a bandwidth limit value of the binding link, wherein the total bandwidth of the centralized scheduler is the bandwidth limit value of the binding link, and generating, by the centralized scheduler, a first number of tokens corresponding to the total bandwidth allocating, by the centralized scheduler, a fourth number of tokens required by a member scheduler to the member scheduler, wherein the fourth number is determined according to a sum of traffic of all member ports on a service processing board where the member scheduler is located, and each service processing board comprises one member scheduler.

9. The non-transitory computer readable storage medium according to claim 8, wherein the centralized scheduler and the member scheduler are connected to form a scheduler link, and the allocating, by the centralized scheduler, the fourth number of tokens required by the member scheduler to the member scheduler comprises:

delivering, by the centralized scheduler, the first number of tokens to the member scheduler along the scheduler link, and after obtaining, by each member scheduler, the required fourth number of tokens, sending the remaining tokens to a next member scheduler on the scheduler link; or requesting, by the member scheduler, the centralized scheduler on the scheduler link to obtain the required fourth number of tokens, wherein the fourth number is determined according to the sum of the traffic of all the member ports on the service processing board where the member scheduler is located.

10. A routing device, comprising:

one or more processors; and a memory for storing instructions, which, when executed by the one or more processors, cause the one or more processors to:

obtain traffic of a member port belonging to a binding link; and allocate corresponding bandwidth to the member port according to total bandwidth of a centralized scheduler and the traffic of the member port;

establish the centralized scheduler according to a bandwidth limit value of the binding link, wherein the total bandwidth of the centralized scheduler is the bandwidth limit value of the binding link, and generate, by the centralized scheduler, a first number of tokens corresponding to the total bandwidth;

wherein the allocating the corresponding bandwidth to the member port according to the total bandwidth of the centralized scheduler and the traffic of the member port comprises:

storing, by the centralized scheduler, first identification information of the member port, and if traffic of a member port polled by the centralized scheduler according to the first identification information does not exceed the total bandwidth, allocating, by the centralized scheduler, a second number of tokens corresponding to the traffic of the polled member port to the polled member port; and if the traffic of the member port polled by the centralized scheduler according to the first identification information exceeds the total bandwidth, allocating, by the centralized scheduler, the first number of tokens to the polled member port, wherein traffic of non-polled member ports is stored in their respective buffers to wait for polling; or storing, by the member port, second identification information of the centralized scheduler, and sending a scheduling request message to the centralized scheduler corresponding to the second identification information, and if traffic of a member port requesting scheduling does not exceed second bandwidth currently allowed by the centralized scheduler, allocating, by the centralized scheduler, the second number of tokens corresponding to the traffic of the member port requesting scheduling to the member port requesting scheduling; and if the traffic of the member port requesting scheduling exceeds the second bandwidth currently allowed by the centralized scheduler, allocating, by the centralized scheduler, a third number of tokens corresponding to the second bandwidth to the member port requesting scheduling.

11. A routing device, comprising:
one or more processors; and
a memory for storing instructions, which, when executed by the one or more processors, cause the one or more processors to:
obtain traffic of a member port belonging to a binding link; and
allocate corresponding bandwidth to the member port according to total bandwidth of a centralized scheduler and the traffic of the member port;
establish the centralized scheduler according to a bandwidth limit value of the binding link, wherein the total bandwidth of the centralized scheduler is the bandwidth limit value of the binding link, and generate, by the centralized scheduler, a first number of tokens corresponding to the total bandwidth;
allocate, by the centralized scheduler, a fourth number of tokens required by a member scheduler to the member scheduler, wherein the fourth number is determined according to a sum of traffic of all member ports on a service processing board where the member scheduler is located, and each service processing board comprises one member scheduler.

* * * * *

UNITED STATES PATENT AND TRADEMARK OFFICE
CERTIFICATE OF CORRECTION

| | |
|---|---|
| PATENT NO. | : 8,553,708 B2 |
| APPLICATION NO. | : 13/185850 |
| DATED | : October 8, 2013 |
| INVENTOR(S) | : Zhang et al. |

It is certified that error appears in the above-identified patent and that said Letters Patent is hereby corrected as shown below:

Title page, item (54), and in the Specification, col. 1, line 1, Title of Invention, "BANDWITH ALLOCATION" should read -- BANDWIDTH ALLOCATION --.

Signed and Sealed this
Twenty-eighth Day of January, 2014

Michelle K. Lee
*Deputy Director of the United States Patent and Trademark Office*